US012762940B2

(12) United States Patent
Shayne et al.

(10) Patent No.: US 12,762,940 B2
(45) Date of Patent: Oct. 13, 2026

(54) MANAGEMENT OF ALERTS BASED ON USER ACTIVITY

(71) Applicant: ObjectVideo Labs, LLC, Tysons, VA (US)

(72) Inventors: Ethan Shayne, Clifton Park, NY (US); Donald Gerard Madden, Columbia, MD (US)

(73) Assignee: ObjectVideo Labs, LLC, Tysons, VA (US)

(*) Notice: Subject to any disclaimer, the term of this patent is extended or adjusted under 35 U.S.C. 154(b) by 125 days.

(21) Appl. No.: 18/308,995

(22) Filed: Apr. 28, 2023

(65) Prior Publication Data

US 2023/0351878 A1 Nov. 2, 2023

Related U.S. Application Data

(60) Provisional application No. 63/337,440, filed on May 2, 2022.

(51) Int. Cl.
*G08B 21/18* (2006.01)
*H04N 7/18* (2006.01)

(52) U.S. Cl.
CPC ............. *G08B 21/18* (2013.01); *H04N 7/183* (2013.01); *H04N 7/188* (2013.01)

(58) Field of Classification Search
CPC ......... G08B 21/18; H04N 7/183; H04N 7/188
See application file for complete search history.

(56) References Cited

U.S. PATENT DOCUMENTS

| | | | |
|---|---|---|---|
| 4,857,912 | A | 8/1989 | Everett, Jr. et al. |
| 5,216,832 | A | 6/1993 | Darby |
| 5,446,445 | A | 8/1995 | Bloomfield et al. |
| 5,612,503 | A | 3/1997 | Sepp |

(Continued)

FOREIGN PATENT DOCUMENTS

| | | | |
|---|---|---|---|
| CA | 2979408 | A1 | 9/2016 |
| CA | 3000035 | A1 | 4/2017 |

(Continued)

OTHER PUBLICATIONS developer.apple.com, [online], "Managing notifications," upon information and belief, available no later than May 2, 2022, retrieved on Jul. 5, 2023, retrieved from URL: <https://developer.apple.com/design/human-interface-guidelines/managing-notifications>, 4 pages.

(Continued)

*Primary Examiner* — Steven Lim
*Assistant Examiner* — James E Munion
(74) *Attorney, Agent, or Firm* — Fish & Richardson P.C.

(57) ABSTRACT

Methods, systems, and apparatus, including computer programs encoded on computer-storage media, for managing alerts based on predicted user activity. In some implementations, a request is received to send an alert to a target device of a target user. A status of the target user is determined. One or more properties of the alert are determined. Using at least the status of the target user and the one or more properties of the alert, the alert is presented on the target device according to a determined delay from a first time period during which the alert would normally be presented to a second, later time period.

20 Claims, 4 Drawing Sheets

(56) References Cited

U.S. PATENT DOCUMENTS

| | | | |
|---|---|---|---|
| 6,134,184 | A | 10/2000 | Waletzky et al. |
| 6,377,858 | B1 | 4/2002 | Koeppe |
| 6,412,210 | B1 | 7/2002 | Horrell |
| 6,603,134 | B1 | 8/2003 | Wild et al. |
| 6,661,340 | B1 | 12/2003 | Saylor et al. |
| 6,909,921 | B1 | 6/2005 | Bilger |
| 6,943,671 | B2 | 9/2005 | McGee et al. |
| 7,084,758 | B1 | 8/2006 | Cole |
| 7,113,090 | B1 | 9/2006 | Saylor et al. |
| 7,471,334 | B1 | 12/2008 | Stenger |
| 7,518,514 | B2 | 4/2009 | Bauchot et al. |
| 7,552,101 | B2 | 6/2009 | Bleines |
| 7,821,386 | B1 | 10/2010 | Barrett et al. |
| 8,063,348 | B1 | 11/2011 | Swaminathan et al. |
| 8,132,491 | B2 | 3/2012 | Real et al. |
| 8,428,918 | B2 | 4/2013 | Atrazhev et al. |
| 8,471,700 | B1 | 6/2013 | Merrill et al. |
| 8,494,227 | B2 | 7/2013 | Prokoski |
| 8,618,927 | B2 | 12/2013 | Wohlert |
| 8,665,084 | B2 | 3/2014 | Shapiro et al. |
| 8,675,071 | B1 | 3/2014 | Vin et al. |
| 8,705,704 | B2 | 4/2014 | Smith et al. |
| 8,705,716 | B2 | 4/2014 | Gregory |
| 8,798,260 | B2 | 8/2014 | Smith et al. |
| 8,825,020 | B2 | 9/2014 | Mozer et al. |
| 8,855,830 | B2 | 10/2014 | Imes et al. |
| 8,922,342 | B1 | 12/2014 | Ashenfelter et al. |
| 8,948,935 | B1 | 2/2015 | Peeters et al. |
| 8,988,215 | B1 | 3/2015 | Trundle et al. |
| 8,994,819 | B2 | 3/2015 | Bennett et al. |
| 9,054,893 | B2 | 6/2015 | Elliot et al. |
| 9,058,734 | B2 | 6/2015 | Xiao et al. |
| 9,089,123 | B1 | 7/2015 | Thomas |
| 9,094,410 | B2 | 7/2015 | Elliot et al. |
| 9,098,279 | B2 | 8/2015 | Mucignat et al. |
| 9,113,052 | B1 | 8/2015 | Scalisi et al. |
| 9,119,038 | B2 | 8/2015 | Woods et al. |
| 9,131,040 | B2 | 9/2015 | Elliot et al. |
| 9,196,148 | B1 | 11/2015 | Hutz |
| 9,230,424 | B1 | 1/2016 | Scalisi et al. |
| 9,253,445 | B2 | 2/2016 | Harrison et al. |
| 9,253,455 | B1 | 2/2016 | Harrison et al. |
| 9,318,015 | B2 | 4/2016 | Kates |
| 9,361,521 | B1 | 6/2016 | McLean et al. |
| 9,373,014 | B1 | 6/2016 | Mehranfar |
| 9,439,034 | B2 | 9/2016 | Lott et al. |
| 9,464,907 | B1 | 10/2016 | Hoareau et al. |
| 9,472,067 | B1 | 10/2016 | Jentoft |
| 9,508,239 | B1 | 11/2016 | Harrison et al. |
| 9,514,630 | B1 | 12/2016 | Steven |
| 9,547,973 | B1 | 1/2017 | Hutz |
| 9,564,034 | B2 | 2/2017 | Foster et al. |
| 9,589,448 | B1 | 3/2017 | Schneider et al. |
| 9,635,540 | B2 | 4/2017 | Mullen |
| 9,643,722 | B1 | 5/2017 | Myslinski |
| 9,696,702 | B2 | 7/2017 | Gruenbacher et al. |
| 9,781,494 | B1 | 10/2017 | Barakat et al. |
| 9,836,885 | B1 | 12/2017 | Eraker et al. |
| 9,919,704 | B1 | 3/2018 | Kundu et al. |
| 9,953,211 | B2 | 4/2018 | Hayasaka |
| 10,026,300 | B1 | 7/2018 | Hutz |
| 10,042,086 | B1 | 8/2018 | Smalley |
| 10,043,360 | B1 | 8/2018 | Mullins et al. |
| 10,086,782 | B1 | 10/2018 | Konrardy et al. |
| 10,117,309 | B1 | 10/2018 | Fu et al. |
| 10,204,275 | B2 | 2/2019 | Shin et al. |
| 10,212,778 | B1 | 2/2019 | Fu et al. |
| 10,229,394 | B1 | 3/2019 | Davis et al. |
| 10,311,694 | B2 * | 6/2019 | McIntosh ............... G06N 5/045 |
| 10,346,811 | B1 | 7/2019 | Jordan et al. |
| 10,412,811 | B1 | 9/2019 | Siminoff et al. |
| 10,445,885 | B1 | 10/2019 | Nathan et al. |
| 10,474,168 | B1 | 11/2019 | Graham et al. |
| 10,514,669 | B1 | 12/2019 | Call et al. |
| 10,586,442 | B1 | 3/2020 | Jensen et al. |
| 10,593,175 | B1 | 3/2020 | Jennings et al. |
| 10,600,297 | B2 | 3/2020 | Kerzner |
| 10,614,689 | B2 | 4/2020 | Bess et al. |
| 10,650,652 | B1 | 5/2020 | Weingart et al. |
| 10,655,968 | B2 | 5/2020 | Rezvani |
| 10,657,383 | B1 | 5/2020 | Solh et al. |
| 10,706,696 | B1 | 7/2020 | Pachikov et al. |
| 10,706,714 | B1 | 7/2020 | Hutz |
| 10,963,681 | B2 | 3/2021 | Madden et al. |
| 10,984,641 | B2 | 4/2021 | Modestine et al. |
| 10,986,717 | B1 | 4/2021 | Fu et al. |
| 11,062,145 | B2 | 7/2021 | Ellerhold et al. |
| 11,072,966 | B1 | 7/2021 | Eubanks et al. |
| 11,104,877 | B2 | 8/2021 | Senaratne et al. |
| 11,176,794 | B1 | 11/2021 | Weingart et al. |
| 11,196,689 | B2 * | 12/2021 | White .................. H04L 51/214 |
| 11,417,199 | B1 | 8/2022 | Hutz |
| 11,430,260 | B2 | 8/2022 | el Kaliouby et al. |
| 11,557,142 | B1 | 1/2023 | Kerzner et al. |
| 11,704,908 | B1 | 7/2023 | Xu et al. |
| 11,856,938 | B1 | 1/2024 | Bart et al. |
| 11,941,114 | B1 | 3/2024 | Bunker et al. |
| 2001/0052862 | A1 | 12/2001 | Roelofs |
| 2002/0087649 | A1 | 7/2002 | Horvitz |
| 2002/0105410 | A1 | 8/2002 | Mann |
| 2003/0025599 | A1 | 2/2003 | Monroe |
| 2003/0069002 | A1 | 4/2003 | Hunter et al. |
| 2003/0128113 | A1 | 7/2003 | Chang et al. |
| 2003/0156027 | A1 | 8/2003 | Seo |
| 2004/0073368 | A1 | 4/2004 | Gonzalez-Banos et al. |
| 2004/0117638 | A1 | 6/2004 | Monroe |
| 2004/0190767 | A1 | 9/2004 | Tedesco et al. |
| 2004/0253908 | A1 | 12/2004 | Thiry |
| 2005/0188076 | A1 | 8/2005 | Rayburn et al. |
| 2005/0248444 | A1 | 11/2005 | Joao |
| 2006/0197661 | A1 | 9/2006 | Tracy et al. |
| 2006/0232774 | A1 | 10/2006 | Kunze |
| 2006/0261818 | A1 | 11/2006 | Zank et al. |
| 2006/0278170 | A1 | 12/2006 | DeMoor et al. |
| 2007/0013493 | A1 | 1/2007 | Liaw |
| 2007/0014439 | A1 | 1/2007 | Ando |
| 2007/0042804 | A1 | 2/2007 | Ryley et al. |
| 2007/0125306 | A1 | 6/2007 | Beecher |
| 2007/0221115 | A1 | 9/2007 | Pollard et al. |
| 2008/0017132 | A1 | 1/2008 | Merrifield et al. |
| 2008/0144884 | A1 | 6/2008 | Habibi |
| 2008/0198009 | A1 | 8/2008 | Hoeben et al. |
| 2008/0291278 | A1 | 11/2008 | Zhang et al. |
| 2008/0314334 | A1 | 12/2008 | Dalton |
| 2009/0009326 | A1 | 1/2009 | Veiga, III |
| 2009/0066488 | A1 | 3/2009 | Qiahe et al. |
| 2009/0099992 | A1 * | 4/2009 | Horvitz .................. H04L 67/51 706/46 |
| 2009/0167862 | A1 | 7/2009 | Jentoft et al. |
| 2009/0259572 | A1 | 10/2009 | Lay et al. |
| 2009/0272326 | A1 | 11/2009 | Bacon |
| 2009/0303042 | A1 | 12/2009 | Song et al. |
| 2010/0074476 | A1 | 3/2010 | Aoki et al. |
| 2010/0217642 | A1 | 8/2010 | Crubtree et al. |
| 2010/0218108 | A1 | 8/2010 | Crabtree et al. |
| 2010/0234998 | A1 | 9/2010 | Kim |
| 2010/0295676 | A1 * | 11/2010 | Khachaturov ......... G08B 21/24 340/309.7 |
| 2011/0082574 | A1 | 4/2011 | Pachet et al. |
| 2011/0102588 | A1 | 5/2011 | Trundle et al. |
| 2011/0112660 | A1 | 5/2011 | Bergmann et al. |
| 2011/0135165 | A1 | 6/2011 | Wechsler et al. |
| 2011/0169633 | A1 | 7/2011 | Lauder et al. |
| 2011/0276396 | A1 | 11/2011 | Rathod |
| 2012/0019353 | A1 | 1/2012 | Knasel |
| 2012/0173414 | A1 | 7/2012 | Hoag |
| 2012/0188081 | A1 | 7/2012 | Katwijk |
| 2012/0276517 | A1 | 11/2012 | Banaszuk et al. |
| 2012/0323796 | A1 | 12/2012 | Udani |
| 2013/0222756 | A1 | 8/2013 | Heugten |
| 2013/0243274 | A1 | 9/2013 | Sukegawa et al. |
| 2013/0268353 | A1 | 10/2013 | Zeto, III et al. |
| 2014/0022051 | A1 | 1/2014 | Levien et al. |
| 2014/0071287 | A1 | 3/2014 | Tu et al. |

(56) References Cited

U.S. PATENT DOCUMENTS

| | | | | |
|---|---|---|---|---|
| 2014/0084165 | A1 | 3/2014 | Fadell et al. | |
| 2014/0091001 | A1 | 4/2014 | Chan et al. | |
| 2014/0118140 | A1 | 5/2014 | Amis | |
| 2014/0160251 | A1 | 6/2014 | Halamish et al. | |
| 2014/0172727 | A1 | 6/2014 | Abhyanker et al. | |
| 2014/0248910 | A1 | 9/2014 | Dave et al. | |
| 2014/0253321 | A1* | 9/2014 | Srinivasan ............. | G08B 27/00 340/539.11 |
| 2014/0254896 | A1 | 9/2014 | Zhou et al. | |
| 2014/0286644 | A1 | 9/2014 | Oshima et al. | |
| 2014/0303884 | A1 | 10/2014 | Levien et al. | |
| 2014/0333776 | A1 | 11/2014 | Dedeoglu et al. | |
| 2014/0334684 | A1 | 11/2014 | Ling | |
| 2014/0336479 | A1 | 11/2014 | Ando | |
| 2014/0365304 | A1 | 12/2014 | Showers et al. | |
| 2014/0365380 | A1 | 12/2014 | Kolay et al. | |
| 2015/0005951 | A1 | 1/2015 | Srinivasan et al. | |
| 2015/0029334 | A1 | 1/2015 | Scalisi | |
| 2015/0049191 | A1 | 2/2015 | Scalisi et al. | |
| 2015/0059086 | A1 | 3/2015 | Clough | |
| 2015/0097678 | A1 | 4/2015 | Sloo et al. | |
| 2015/0109104 | A1 | 4/2015 | Fadell et al. | |
| 2015/0109338 | A1 | 4/2015 | McKinnon et al. | |
| 2015/0112885 | A1 | 4/2015 | Fadell et al. | |
| 2015/0127486 | A1 | 5/2015 | Advani | |
| 2015/0154850 | A1 | 6/2015 | Fadell et al. | |
| 2015/0156030 | A1 | 6/2015 | Fadell et al. | |
| 2015/0193127 | A1 | 7/2015 | Chai et al. | |
| 2015/0205298 | A1 | 7/2015 | Stoschek et al. | |
| 2015/0228167 | A1 | 8/2015 | Scalisi et al. | |
| 2015/0234048 | A1 | 8/2015 | Miller et al. | |
| 2015/0253253 | A1 | 9/2015 | Smith et al. | |
| 2015/0283253 | A1 | 10/2015 | Ying et al. | |
| 2015/0290808 | A1 | 10/2015 | Renkis | |
| 2015/0301182 | A1 | 10/2015 | Geiger et al. | |
| 2015/0310381 | A1 | 10/2015 | Lyman et al. | |
| 2015/0312531 | A1 | 10/2015 | Samad et al. | |
| 2015/0339912 | A1 | 11/2015 | Farrand et al. | |
| 2015/0347902 | A1 | 12/2015 | Butler, Jr. et al. | |
| 2015/0347910 | A1 | 12/2015 | Fadell et al. | |
| 2015/0367513 | A1 | 12/2015 | Gettungs et al. | |
| 2016/0047663 | A1 | 2/2016 | Iyer et al. | |
| 2016/0053744 | A1 | 2/2016 | Wenger et al. | |
| 2016/0063642 | A1 | 3/2016 | Luciani et al. | |
| 2016/0071183 | A1 | 3/2016 | Joshi et al. | |
| 2016/0088286 | A1 | 3/2016 | Forsythe et al. | |
| 2016/0107749 | A1 | 4/2016 | Mucci | |
| 2016/0116303 | A1 | 4/2016 | Rose et al. | |
| 2016/0140818 | A1 | 5/2016 | Viviani et al. | |
| 2016/0180620 | A1 | 6/2016 | Eyring et al. | |
| 2016/0188126 | A1 | 6/2016 | Dides | |
| 2016/0189532 | A1 | 6/2016 | Malhorta et al. | |
| 2016/0195856 | A1 | 7/2016 | Spero | |
| 2016/0217345 | A1 | 7/2016 | Appel et al. | |
| 2016/0239723 | A1 | 8/2016 | Ge | |
| 2016/0266577 | A1 | 9/2016 | Kerzner | |
| 2016/0274230 | A1 | 9/2016 | Wu et al. | |
| 2016/0284170 | A1 | 9/2016 | Kasmir et al. | |
| 2016/0291966 | A1 | 10/2016 | Johnson | |
| 2016/0300474 | A1 | 10/2016 | Warren et al. | |
| 2017/0011477 | A1 | 1/2017 | Murphey | |
| 2017/0027157 | A1 | 2/2017 | Purpura | |
| 2017/0034485 | A1 | 2/2017 | Scalisi | |
| 2017/0046567 | A1 | 2/2017 | Hong et al. | |
| 2017/0052539 | A1 | 2/2017 | Kerzner | |
| 2017/0073085 | A1 | 3/2017 | Tremblay et al. | |
| 2017/0085844 | A1 | 3/2017 | Scalisi et al. | |
| 2017/0134895 | A1 | 5/2017 | Rabb | |
| 2017/0148290 | A1 | 5/2017 | Yang et al. | |
| 2017/0174180 | A1 | 6/2017 | Hoyos et al. | |
| 2017/0187993 | A1 | 6/2017 | Martch et al. | |
| 2017/0206449 | A1 | 7/2017 | Lain | |
| 2017/0238505 | A1 | 8/2017 | Gordon et al. | |
| 2017/0251173 | A1 | 8/2017 | Siminoff et al. | |
| 2017/0251633 | A1 | 9/2017 | Womble et al. | |
| 2017/0263067 | A1 | 9/2017 | Scalisi | |
| 2017/0273277 | A1 | 9/2017 | Monk | |
| 2017/0278348 | A1 | 9/2017 | Takeda | |
| 2017/0280109 | A1 | 9/2017 | Scalisi | |
| 2017/0287242 | A1 | 10/2017 | Meganathan | |
| 2017/0322942 | A1 | 11/2017 | Duda et al. | |
| 2017/0341746 | A1 | 11/2017 | Erickson et al. | |
| 2017/0344858 | A1 | 11/2017 | Ohira et al. | |
| 2017/0352015 | A1 | 12/2017 | Xu et al. | |
| 2017/0358186 | A1 | 12/2017 | Harpole | |
| 2017/0358188 | A1 | 12/2017 | Harpole | |
| 2018/0000575 | A1 | 1/2018 | Fobi et al. | |
| 2018/0005143 | A1 | 1/2018 | Camargo et al. | |
| 2018/0018508 | A1 | 1/2018 | Tusch | |
| 2018/0020424 | A1* | 1/2018 | Almalki ................. | H04B 1/385 |
| 2018/0027772 | A1 | 2/2018 | Gordon et al. | |
| 2018/0034657 | A1 | 2/2018 | Brown et al. | |
| 2018/0047128 | A1 | 2/2018 | Ross et al. | |
| 2018/0048688 | A1 | 2/2018 | Siminoff et al. | |
| 2018/0063478 | A1 | 3/2018 | Siminoff et al. | |
| 2018/0075718 | A1 | 3/2018 | Modestine | |
| 2018/0081539 | A1 | 3/2018 | Ghassabian | |
| 2018/0082554 | A1 | 3/2018 | Siminoff et al. | |
| 2018/0091569 | A1 | 3/2018 | Roth et al. | |
| 2018/0091730 | A1 | 3/2018 | Nixon et al. | |
| 2018/0101734 | A1 | 4/2018 | Lemberger et al. | |
| 2018/0101735 | A1 | 4/2018 | Lemberger et al. | |
| 2018/0102938 | A1* | 4/2018 | Yoon ..................... | G06F 16/358 |
| 2018/0103200 | A1 | 4/2018 | Bracy | |
| 2018/0113200 | A1 | 4/2018 | Steinberg et al. | |
| 2018/0114420 | A1 | 4/2018 | Siminoff et al. | |
| 2018/0125058 | A1 | 5/2018 | Liu | |
| 2018/0129881 | A1 | 5/2018 | Seeber et al. | |
| 2018/0137728 | A1 | 5/2018 | Hahn | |
| 2018/0139332 | A1 | 5/2018 | Kerzner | |
| 2018/0146169 | A1 | 5/2018 | Siminoff et al. | |
| 2018/0151039 | A1 | 5/2018 | Lemberger et al. | |
| 2018/0158305 | A1 | 6/2018 | Noland et al. | |
| 2018/0165933 | A1 | 6/2018 | Siminoff | |
| 2018/0176516 | A1 | 6/2018 | Modestine et al. | |
| 2018/0176517 | A1 | 6/2018 | Modestine et al. | |
| 2018/0178781 | A1 | 6/2018 | Funk et al. | |
| 2018/0192009 | A1 | 7/2018 | Jeong | |
| 2018/0204433 | A1 | 7/2018 | Takahashi et al. | |
| 2018/0205911 | A1 | 7/2018 | Siminoff et al. | |
| 2018/0211115 | A1 | 7/2018 | Klein | |
| 2018/0231653 | A1 | 8/2018 | Pradeep et al. | |
| 2018/0247504 | A1 | 8/2018 | Siminoff et al. | |
| 2018/0260620 | A1 | 9/2018 | Brent et al. | |
| 2018/0300557 | A1 | 10/2018 | Rodenas et al. | |
| 2018/0322755 | A1 | 11/2018 | Staszel | |
| 2018/0350219 | A1 | 12/2018 | Correnti | |
| 2018/0375813 | A9 | 12/2018 | Vendrow et al. | |
| 2019/0011909 | A1 | 1/2019 | Kerzner | |
| 2019/0012887 | A1 | 1/2019 | Troesch et al. | |
| 2019/0020669 | A1 | 1/2019 | Glatfelter et al. | |
| 2019/0027255 | A1 | 1/2019 | D'Amelia | |
| 2019/0033446 | A1 | 1/2019 | Bultan et al. | |
| 2019/0035242 | A1 | 1/2019 | Vazirani | |
| 2019/0057587 | A1 | 2/2019 | Jones et al. | |
| 2019/0069535 | A1 | 3/2019 | Hauck | |
| 2019/0072985 | A1 | 3/2019 | Taveira et al. | |
| 2019/0082149 | A1 | 3/2019 | Correnti et al. | |
| 2019/0095820 | A1 | 3/2019 | Pourmohammad | |
| 2019/0108404 | A1 | 4/2019 | Xu | |
| 2019/0108405 | A1 | 4/2019 | Xu | |
| 2019/0108407 | A1 | 4/2019 | Okayasu | |
| 2019/0122522 | A1 | 4/2019 | Stefanski et al. | |
| 2019/0123931 | A1 | 4/2019 | Schuster et al. | |
| 2019/0139217 | A1 | 5/2019 | Szu | |
| 2019/0141919 | A1 | 5/2019 | Kundra et al. | |
| 2019/0156496 | A1 | 5/2019 | Leduc | |
| 2019/0191033 | A1 | 6/2019 | Kerzner | |
| 2019/0212125 | A1 | 7/2019 | Deleule et al. | |
| 2019/0217131 | A1 | 7/2019 | Zechlin | |
| 2019/0236342 | A1 | 8/2019 | Madden et al. | |
| 2019/0246075 | A1 | 8/2019 | Khadloya et al. | |
| 2019/0313629 | A1 | 10/2019 | Trainor | |
| 2020/0012887 | A1 | 1/2020 | Li et al. | |

(56) References Cited

U.S. PATENT DOCUMENTS

| | | | |
|---|---|---|---|
| 2020/0035080 | A1 | 1/2020 | Correnti |
| 2020/0068351 | A1 | 2/2020 | Galvez et al. |
| 2020/0110946 | A1 | 4/2020 | Kline et al. |
| 2020/0159723 | A1 | 5/2020 | Goyal |
| 2020/0161520 | A1 | 5/2020 | Hugon et al. |
| 2020/0178500 | A1 | 6/2020 | Winn |
| 2020/0180560 | A1 | 6/2020 | Okada |
| 2020/0193615 | A1 | 6/2020 | Goncharov et al. |
| 2020/0210714 | A1 | 7/2020 | Kato |
| 2020/0211345 | A1 | 7/2020 | Gordon-Carroll et al. |
| 2020/0228665 | A1 | 7/2020 | Kerzner |
| 2020/0250971 | A1 | 8/2020 | Zhao et al. |
| 2020/0265694 | A1 | 8/2020 | Xu et al. |
| 2020/0278209 | A1 | 9/2020 | Rezvani |
| 2020/0327315 | A1 | 10/2020 | Mullins et al. |
| 2020/0327682 | A1 | 10/2020 | Nater et al. |
| 2020/0329694 | A1 | 10/2020 | Tsai |
| 2020/0333780 | A1 | 10/2020 | Kerzner |
| 2020/0334850 | A1 | 10/2020 | Ross et al. |
| 2020/0358908 | A1 | 11/2020 | Scalisi |
| 2020/0363825 | A1 | 11/2020 | Aoki |
| 2021/0096239 | A1 | 4/2021 | Yasugi et al. |
| 2021/0103301 | A1 | 4/2021 | McCoy |
| 2021/0144261 | A1 | 5/2021 | Kerzner |
| 2021/0201005 | A1 | 7/2021 | Madden et al. |
| 2021/0267172 | A1 | 9/2021 | Huber et al. |
| 2021/0333109 | A1 | 10/2021 | Rezvani |
| 2022/0027637 | A1 | 1/2022 | Madden et al. |
| 2022/0028109 | A1 | 1/2022 | Kang |
| 2022/0057519 | A1 | 2/2022 | Goldstein et al. |
| 2022/0076549 | A1 | 3/2022 | Weingart et al. |
| 2022/0222943 | A1 | 7/2022 | Loeshelle |
| 2022/0303395 | A1 | 9/2022 | Kerzner |
| 2022/0375330 | A1 | 11/2022 | Hutz |
| 2023/0043724 | A1 | 2/2023 | Morrow et al. |
| 2023/0089720 | A1 | 3/2023 | Whitaker et al. |
| 2023/0169836 | A1 | 6/2023 | Brandfass et al. |
| 2024/0242581 | A1 | 7/2024 | Kerzner et al. |

FOREIGN PATENT DOCUMENTS

| | | | | |
|---|---|---|---|---|
| CN | 103561177 | A | 2/2014 | |
| CN | 106097495 | A | 11/2016 | |
| CN | 206369117 | U | 8/2017 | |
| CN | 115250318 | A | 10/2022 | |
| DE | 102016124890 | A1 | 6/2018 | |
| EP | 1703437 | A2 | 9/2006 | |
| EP | 2393058 | A1 | 12/2011 | |
| JP | S62-264390 | A | 11/1987 | |
| JP | 2010-072831 | A | 4/2010 | |
| JP | 2011-243054 | A | 12/2011 | |
| KR | 10-1653125 | B1 | 9/2016 | |
| TW | 201708995 | A | 3/2017 | |
| WO | WO 2009/147663 | A2 | 12/2009 | |
| WO | WO 2015/029007 | A1 | 3/2015 | |
| WO | WO 2015/179120 | A1 | 11/2015 | |
| WO | WO 2016/057761 | A2 | 4/2016 | |
| WO | WO-2016108104 | A1 * | 7/2016 | ........... A01D 34/008 |
| WO | WO 2016/180796 | A2 | 11/2016 | |
| WO | WO 2017/038125 | A1 | 3/2017 | |
| WO | WO 2017/212901 | A1 | 12/2017 | |

OTHER PUBLICATIONS developer.apple.com, [online], "Modifying content in newly delivered notifications," upon information and belief, available No. later than May 2, 2022, retrieved on Jul. 5, 2023, retrieved from URL: <https://developer.apple.com/documentation/usernotifications/modifying_content_in_newly_delivered_notifications/>, 4 pages.

Edwards, Benj., "How to Quickly Turn Off Annoying Notifi cations on iPhone or iPad," How-To Geek, Apr. 29, 2020, 7 pages.

PCT Invitation to Pay Additional Fees in International Appln. PCT/US2023/20375, mailed on Jul. 12, 2023, 2 pages.

User YSS, "Update existing notification with a badge, or by deleting previous notification," Apple, Inc. (Developer Forums), on or before 2016, 2 pages.

PCT International Search Report and Written Opinion in International Appln. No. PCT/US2023/020375, dated Sep. 19, 2023, 11 pages.

Cnet.com [online], "At CES, flying drones are Alarm.com's home security moonshot," Jan. 3, 2017, retrieved on Apr. 5, 2023, retrieved from URL <https://www.cnet.conn/news/at-ces-flying-drones-are-alarm-conn-home-security-moonshot-ces-2017/>, 4 pages.

Das et al., "Designing and modeling smart environments," Proceedings from the 2006 International Symposium on a World of Wireless, Mobile and Multimedia Networks (WoWMoM'06), Buffalo—Niagara Falls, NY, Jun. 26-29, 2006, 5 pages.

Gatech.com [online], "In Emergencies, Should You Trust a Robot?," Feb. 29, 2016, retrieved Apr. 5, 2023, retrieved from URL <https://www.news.gatech.edu/2016/02/29/emergencies-should-you-trust-robot>, 6 pages.

Heimfarth et al., "Alarm delivery to Unmanned Aerial Vehicles in wireless sensor networks using coordinators", 16th IEEE International Symposium on Object/Component/Service-Oriented Real-Time Distributed Computing (ISORC 2013), IEEE, Jun. 19, 2013, 8 pages.

Issuelab.org [online], "Drones for Disaster Response and Relief Operations," Apr. 2015, retrieved on Feb. 29, 2024, retrieved from URL <https://www.issuelab.org/resources/21683/21683.pdf>, 52 pages.

Lopez et al., "WatchBot: A building maintenance and surveillance system based on autonomous robots," Robotics and Autonomous Systems, Dec. 2013, 61(12):1559-1571 (Abstract Only).

Moosbrugger et al., "R2U2: Monitoring and Diagnosis of Security Threats for Unmanned Aerial Systems," Formal Methods in System Design, Apr. 12, 2017, 51:31-61.

Mutlu et al., "Indoor Navigation and Guidance of an Autonomous Robot Vehicle with Static Obstacle Avoidance and Optimal Path Finding Algorithm," IFAC Control Proceedings Volumes, Sep. 2012, 45(24):315-319.

Robinette et al., "Overtrust of Robots in Emergency Evacuation Scenarios," IEEE, Mar. 7, 2016, XP058081766, pp. 101-108.

Yuan et al., "Machine Learning in Intelligent Video and Automated Monitoring", The Scientific World Journal, Apr. 9, 2015, 200 pages.

* cited by examiner

MANAGEMENT OF ALERTS BASED ON USER ACTIVITY

CROSS-REFERENCE TO RELATED APPLICATION

This application claims the benefit of U.S. Provisional Application No. 63/337,440, filed on May 2, 2022 and titled "Management of Alerts Based on User Activity", the contents of which are incorporated by reference herein.

TECHNICAL FIELD

This disclosure application relates generally to property monitoring systems.

BACKGROUND

Alerts from one or more devices can provide notifications or reminders of tasks or events that require a user's attention. Examples of alerts can include alerts for a text message, a phone call, an email, and a doorbell. Some alerts can include reminders that can remind the user of certain tasks or events. Some alerts can be from one or more smart devices in a home or an office. For example, some alerts can be generated from a smart dryer, a smart refrigerator, a smart oven, or a home monitoring/security system.

SUMMARY

In general, one innovative aspect of the subject matter described in this specification can be embodied in methods that include the actions of receiving a request to send an alert to a target device of a target user; determining a status of the target user; determining one or more properties of the alert; and using at least the status of the target user and the one or more properties of the alert, determining to delay presentation of the alert on the target device from a first time period during which the alert would normally be presented to a second, later time period.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination.

In some implementations, determining to delay presentation of the alert on the target device comprises determining to delay sending the alert to the target device for a delay time period to cause delayed presentation of the alert on the target device during the second, later time period.

In some implementations, the method includes: in response to determining to delay presentation of the alert on the target device, sending, to the target device, a message that includes instructions to cause the target device to delay presentation of the alert from the first time period during which the alert would normally be presented to the second, later time period.

In some implementations, the method includes: obtaining, from one or more sensors at a monitored property, sensor data that monitors locations at the monitored property; and wherein determining the status of the target user comprises: determining, using the sensor data, a likelihood that the target user at the monitored property is likely engaged in an activity; and using the determined likelihood that the user is engaged in the activity, determining the status of the target user who is likely engaged in the activity.

In some implementations, the method includes: determining a time for sending the alert to the target device using a result of whether the determined status of the user satisfies a threshold criteria and the one or more determined properties of the alert; and sending the alert to the target device at the monitored property at the determined time.

In some implementations, determining, using the sensor data, the likelihood that the target user at the monitored property is likely engaged in the activity comprises determining, using the sensor data, a type of the activity the target user is likely engaged in.

In some implementations, determining the likelihood that target user at the monitored property is likely engaged in the activity uses at least one of a first level of movement of the target user in the monitored property; a second level of movement of one or more other users in the monitored property; a noise level associated with the target user or the one or more other users; a number of notifications received by the target device of the target user within a threshold time period using one or more of (i) visualizations that display on the target device from the sensor data or (ii) auditory notifications that emit from the target device detected using the sensor data; appliance data from one or more appliances at the monitored property; a number of notifications received from the target device; or determining, from health monitoring data, a movement level of the target user.

In some implementations, determining the one or more properties of the alert comprises determining an expiration of time for sending the alert to the target device prior to the alert elapsing.

In some implementations, the method includes: determining the one or more properties of the alert comprises determining a type of interaction required when providing the received alert to the target user; and determining to delay sending the alert to the target device using the determined type of interaction.

In some implementations, the status comprises a predicted status of the target user; and determining to delay sending the alert to the target device comprises: predicting a duration for an activity of the target user; determining whether the predicted status of the target user satisfies a status criteria; and in response to determining that the predicted status of the target user does not satisfy the status criteria, determining to delay sending the alert to the target device to a time following the predicted duration for the activity of the target user.

In one aspect, a method includes: receiving a request to send an alert to a target device of a target user; determining a status of the target user; determining one or more properties of the alert; and using at least the status of the target user and the one or more properties of the alert, merging the alert with another alert for sending a single merged alert to the target device instead of the alert and the other alert.

In some implementations, the method includes: determining to delay sending the alert to the target device; receiving a second request to send the other received alert to the target device of the target user; and determining that the alert and the second alert satisfy a similarity criteria, wherein merging the alert with the other alert comprises: in response to determining that the alert and the second alert satisfy the similarity criteria, creating a merged alert by merging the alert and the other alert; and sending the merged alert to the target device according to a determined delay.

In some implementations, determining to delay sending the alert to the target device comprises determining the delay.

In some implementations, the single merged alert comprises data from both the alert and the other alert.

In some implementations, the single merged alert comprises data from a most recently generated of the alert or the other alert.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
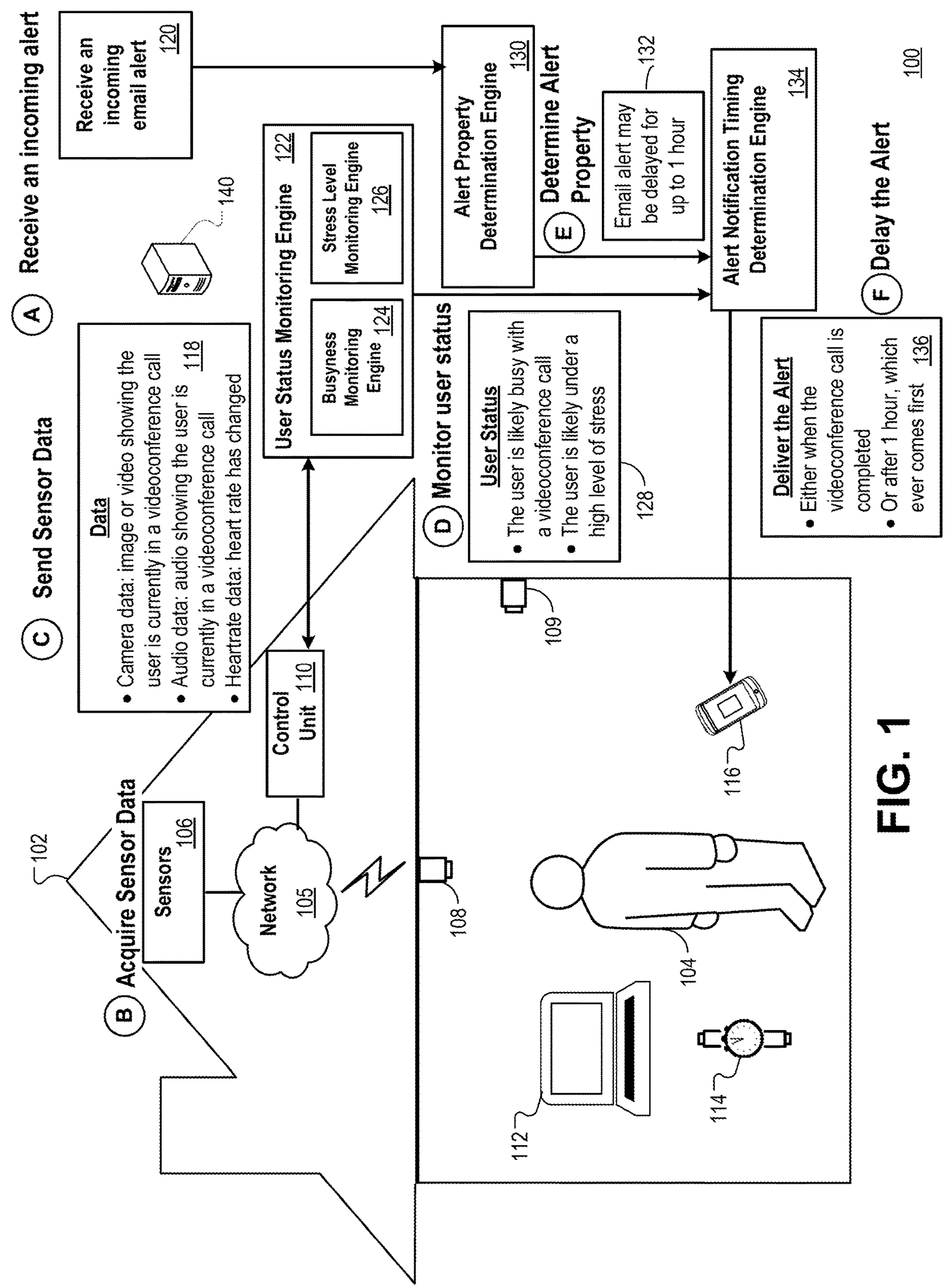
FIG. 1 is a diagram illustrating an example of an alert management system.

The disclosed systems, methods, and techniques generally relate to management of alerts based on predicted user activity and delaying alert presentation on a device, e.g., to a user, until a more convenient time. A property monitoring system uses sensor data from security cameras, audio sensors, wearables, oven, refrigerators, etc., to determine what activity the user is likely engaged in, and can consider other factors like urgency of the alert, likely stress of the user, or both, to determine whether to delay alerts to a later time.

For instance, alerts can come at inconvenient times and can sometimes lead to an overload of inputs. A user may be overwhelmed by a lot of alerts, although some of the alerts may not demand immediate attention.

One method to manage the alerts is to manually set the device that sends the alerts in a mode, e.g., a quiet mode, such that the device can stop sending all the alerts. However, this method requires the user to manually set and unset this mode, adding an additional task to the user. In some implementations, this method typically blocks most if not all alerts while the quiet mode is active and it is up to the user to catch up the alerts after deactivating the quiet mode.

Another method to manage the alerts is to allow a smart device to automatically switch between a few different modes, and users can define who is and is not allowed to interrupt when a particular mode is active. However, the smart device's ability to determine the correct mode can be fairly limited. The level of granularity for allowed-interruptions is based on the source of the alert (e.g., who is calling, whether the caller is on a VIP or favorites list, etc.) and/or the type of the application (e.g., Outlook, Twitter), rather than on a per-alert basis. Furthermore, there is no mechanism for delaying notifications and it is up to the user to proactively catch-up on the pending alerts, all at once, after a particular mode is deactivated.

The subject matter described in this specification can be implemented in particular embodiments so as to realize one or more of the following advantages. When alerts come at inconvenient times, the described property monitoring system can automatically determine whether to delay each alert to a later time using at least the status of a target user of the alert, the properties of each alert, or both. This can reduce an amount of computing resources required by the property monitoring system because the property monitoring system need not continue to monitor the status of the alert and whether the alert has been opened, resend an alert, or both. The alert management system can automatically determine a more convenient later time to send each pending alert to a target device of the target user. The alert management system can automatically determine whether a pending alert has expired at a later time, and can determine to stop or skip sending the pending alert, eliminating the need for the computing resources that would have been required to send the pending alert. In some implementations, the alert management system can evaluate fine-grained details about the alert, fine-grained details about the user status, or both, and can determine to deliver the alert in a convenient manner and at a convenient time. In some implementations, by determining a more convenient later time to send each pending alert to a target device of the target user, the alert management system can provide an improved user experience. For example, determining a more convenient time for sending an alert to the target device of the target user can ultimately avoid excessive stress for user and aid the user in managing and prioritizing incoming alerts and/or other information.

In some examples, the alert management system can automatically determine to delay presentation of an alert on a user's client device to more convenient times, which can improve system efficiency and processing. By delaying presentation of the alert, the alert management system can reduce a likelihood of network unavailability by transmitting the message to the client device as soon as it determines an alert should be presented instead of transmitting the alert right before a presentation time. In some examples, by automatically determining to delay presentation of the alert on the client device to the user, the client device and the property monitoring system can improve computational processing by not processing the alert the right away and enabling the client device to focus on other processes. In some examples, delaying presentation of an alert can save computational resources when a device or system ultimately determines to skip presenting the alert, e.g., given changes in contextual information such as a changed property for the alert or status of a target user.

FIG. 1 is a diagram illustrating an example of an alert management system 100. The system 100 includes one or more sensors 106 that monitor a property 102. The property 102 can be a residential property or a commercial property. Residents and homeowners can equip their properties with home security systems that have sensors 106 to enhance the security, safety, or convenience of their properties. Examples of the sensors 106 can include an audio sensor 109, a motion sensor, a camera at various locations throughout the property 102 (e.g., a camera 108 inside a room) that monitor at least a portion of the property 102, light sensors, and other sensors.

The sensors 106 can include sensors at or belonging to one or more appliances at the property, such as an oven, a refrigerator, a washer, a dryer, a stovetop, etc. The sensors 106 can include sensors at one or more user devices of a user located at the property. Examples of user devices include cell phones, smart phones, smart watches, smart glasses, etc. In some examples, a health-monitoring sensor can be a wearable sensor that attaches to a user in the property 102. The health-monitoring sensor can collect various health data, including but not limited to pulse, heart rate, respiration rate, sugar or glucose level, bodily temperature, or motion data.

The sensors 106 can generate sensor data 118 that can be used to determine a status of a target user in the property 102. Some sensor data 118 can be used to monitor the likely activity level of the household in general, the likely level of activity for each individual user who may receive alerts, or both. For example, the system 100 can use images or videos captured by the camera 108 to predict the level of movement of the target user 104 of an incoming alert 120, as well as the movement of other people or objects around the target user 104. In some examples, the system can use sensor data from an audio sensor 109 to predict the noise levels in the property, e.g., whether there is talking, shouting, barking, etc. In some examples, the system can use the sensor data from the health-monitoring sensor to determine how active the target user 104 is, a status of the target user, or both, e.g., whether the user is running, walking, sitting, sleeping, etc.

The system 100 can use the sensor data 118 generated by the sensors 106 to monitor an amount of notifications that are currently demanding a user's attention, as described in more detail below. The system 100 can use the sensor data 118 to predict whether a target user is already overwhelmed with notifications. For example, the user status monitoring engine 122 can use the sensor data from the camera sensor 108, the audio sensor 109, or both, to detect incoming notifications as the notifications appear or ring on one or more user devices, e.g., a phone 116, a computer 112, or a smart watch 115. In some implementations, a user device can send the device's level of pending notifications to a server 140 that monitors the user status, e.g., a server 140 that implements the user status monitoring engine 122. In some implementations, a home security system installed at the property 102 can obtain data indicating how many of its own alerts are being sent to one or more users of the household at any given time. For example, a control unit 110 of a home security system can obtain alerts that it is sending to any individual household member at any given time, and the control unit 110 can provide the level of alerts to a server 140 that implements the user status monitoring engine 122.

The system 100 can use the sensor data 118 generated by the sensors 106 to determine a target user's predicted current stress level, as described in more detail below. For example, the system 100 can use sensor data from a wearable device, e.g., a smart watch 114, to predict the heart rate, blood pressure, the pulse, and/or the galvanic skin response and their respective changes. The system 100 can use sensor data from an infrared camera to predict changes in a target user's body temperature. The system 100 can use sensor data from a transdermal camera to predict changes in a target user's heart rate. An audio sensor 109 can obtain voices of a target user and the user status monitoring engine 122 that includes a stress level monitoring engine 126, e.g., a voice stress analysis device, can determine a likely stress level of the target user based on the target user's interaction with other people, based on automated voice assistants, or both. A camera sensor 108 can obtain videos of a target user and the system can predict the target user's likely stress level based on video analytics applied on the videos.

The one or more sensors 106 can communicate with a control unit 110 that is located at the property 102. The control unit 110 can be, for example, a computer system or other electronic device configured to communicate with the sensors 106. The control unit 110 can perform various management tasks and functions for the system 100. In some implementations, a resident of the property, or another user, can communicate with the control unit 110 (e.g., input data, view settings, or adjust parameters) through a physical connection, such as a touch screen or keypad, through a voice interface, over a network connection, or a combination thereof.

The sensors 106 may communicate with the control unit 110 over a network 105. The network 105 can be any communication infrastructure that supports the electronic exchange of data between the control unit 110 and the one or more sensors 106. For example, the network 105 may include a local area network (LAN). The network 105 may be any one or combination of wireless or wired networks and may include any one or more of Ethernet, Bluetooth, Bluetooth LE, Z-wave, ZigBee, or Wi-Fi technologies.

The system 100 can include a server 140 that manages the alerts received by the system 100. The server 100 can include a user status monitoring engine 122, an alert property determination engine 130, and an alert notification timing determination engine 134. The server 140 can be, for example, one or more computer systems, server systems, or other computing devices that are located at the property 102, remotely from the property 102, or a combination of both. The server 140 can be configured to process the sensor data 118 obtained from the sensors 106, and determine whether one or more alerts can be delayed. In some implementations, the server 140 can be a cloud computing platform. In some implementations, the server 140 can implement the control unit 110.

The system 100 can include a user status monitoring engine 122. The user status monitoring engine 122 can receive sensor data 118 generated by sensors 106 at the property 102 and can monitor the status of a target user 104 in the property 102 based on the sensor data 118. For example, the user status monitoring engine 122 can perform analysis based on the camera data and the audio data in the sensor data 118. The camera data, e.g., the image or video, and the audio data can show that a target user 104 of the incoming alert 120 is currently in a videoconference call. The user status monitoring engine 122 can determine that the target user 104 is likely currently busy because the target user 104 is in a videoconference call using the received sensor data 118.

In some implementations, the user status monitoring engine 122 can include a busyness monitoring engine 124 that can monitor the busyness of the household, a target user 104, or both. For example, the busyness monitoring engine 124 can use cameras 108 and other sensors in a home to determine how busy any individual user is likely at a current moment. The busyness monitoring engine can predict a level of activity of a target user 104, e.g., likely idle, likely not busy, likely busy, likely extremely busy, etc. In some implementations, the busyness monitoring engine 124 can predict a general level of activity in the household. In some implementations, the busyness monitoring engine 124 can predict the level of activity for each individual user who may receive alerts, e.g., for each account for the property 102. In some implementations, the busyness monitoring engine 124 can determine the likely busyness by determining how many notifications are currently demanding a user's attention. If the user is likely currently overwhelmed by a number of notifications, the busyness monitoring engine 124 can determine that the user is likely currently busy.

In some implementations, the user status monitoring engine 122 can include a stress level monitoring engine 126. The stress level monitoring engine 126 can predict the user's current likely stress level based on sensor data 118 generated by the sensors 106 at the property. For example, the system can use sensor data from wearables such as a smart watch 114 to predict the heart rate or galvanic skin response changes of the target user 104, and these changes can indicate the likely stress level of the target user 104.

In some implementations, the stress level monitoring engine 126 can predict a user's likely stress level based on an individual user's likely stress tolerance. Different people can have different thresholds for how much concurrent input they can handle. User A may only be able to tolerate one alert notification at a time in a quiet environment, while user B may be able to handle several alerts at once while dogs are barking. The stress level monitoring engine 126 can monitor stress-level associations with likely activity levels and concurrent notification load covering a period of time for one or more users in the property 102. The stress level monitoring engine 126 can determine an individual user's tolerance or limit on the likely activity levels, the concurrent notification load, prior maximum activity levels, or a combination of two or more of these.

In some examples, the stress level monitoring engine 126 can measure historical time-to-respond metrics of the user to aid in determining the user tolerance or limit. In further detail, the stress level monitoring engine 126 can determine, for example, the user takes 1 second, 2 seconds, or greater when responding to notifications on a client device. The stress level monitoring engine 126 can compare the amount of time taken by a user to respond to notifications and correlate such measured times to concurrent detected activities during that time. Using the comparison, the stress level monitoring engine 126 can generate a prediction of the user tolerance level, and do the same for multiple users.

In some examples, the stress level monitoring engine 126 can compare the time period to a time period threshold. If the time period does not satisfy the time period threshold, the stress level monitoring engine 126 can determine the user's tolerance is likely low. For example, if the stress level monitoring engine 126 determines a user's client device has received a number of notifications during a prior time period, no background activity or user activity occurs during the prior time period, and the user's response time slowly increases for each notification over that time period, then the stress level monitoring engine 126 can predict the user's tolerance level is likely low.

In some examples, the stress level monitoring engine 16 can determine that the time period satisfies the time period threshold. For instance, if the stress level monitoring engine 126 determines a user's client device has received a number of notifications during a prior time period, dogs are barking and kids are screaming in the background, and the user's response time remains the same for each notification over that time period, then the stress level monitoring engine 126 can predict the user's tolerance level is likely high. Other examples are possible.

The stress level monitoring engine 126 can compare the monitored stress level with the individual user's tolerance or limit to determine when a user's stress level satisfies, e.g., is exceeding, the tolerance level. The stress level monitoring engine 126 can notify one or more of the other engines to avoid sending one or more alerts to the user when the stress level satisfies the tolerance level. Based at least on the knowledge of this individualized tolerance or limit, the system can more accurately predict a target user's likely stress level, and the system can delay one or more notifications accordingly, e.g., before a user's likely stress level increases to a certain level.

In some implementations, the stress level monitoring engine 126 can predict an individual user's stress level or behavior level based on learned correlations between sensor data and its correlation with the stress level and stress tolerance for the individual user. The sensor data can include body data of the individual user, e.g., heart rate, galvanic skin response changes, etc., and current activities in the environment. For example, the system can provide a "Do not bother me right now" response option on incoming notifications. When the user selects this option, the system can associate the current sensor data with "high stress level". Thus, the system can learn the correlation between sensor data and stress level of the individual user to identify a type of behavior of the user.

In some implementations, the user status monitoring engine 122 can assign one or more availability metrics to a user. For example, the user status monitoring engine 122 can assign a time budget, e.g., in seconds, for a user indicating the likely available time from the user. The user status monitoring engine 122 can assign an attention budget for a user indicating the likely available attention from the user. For example, the attention budget can indicate types of actions that a user might have to perform in response to the alert or the notification. The attention budget can indicate a remaining number of particular types of actions, a total remaining number of actions, or both. For some types of actions, the attention budget can indicate that an unlimited number of the actions are available, e.g., viewing the weather. The user status monitoring engine 122 can assign a stress budget to a user indicating the likely stress level of the user.

In some implementations, the availability metrics of a user can be a multi-dimensional vector. In some implementations, the different availability metrics of a user can be combined to generate an overall availability score. When one or more notifications arrives, either in an order of urgency or in an order of priority, an alert notification time determination engine 134 can determine alert notification times of the one or more orders based on the multiple availability metrics of the user or the overall availability score of the user.

The system 100 can include an alert property determination engine 130. The alert property determination engine 130 can determine one or more properties of an incoming alert. The properties of an alert can include a level of urgency, a time range for sending the alert, a maximum length of time for which the alert can be delayed, whether a delayed alert has expired, another appropriate property, or a combination of two or more of these. The alert property determination engine 130 can obtain these properties of the alert that has been provided by a user device of the system 100 or has been determined by the system 100.

In some implementations, the alert property determination engine 130 can determine the level of urgency of an incoming alert. Some alerts may require immediate attention, regardless of the impact on the user. For example, a fire alarm must get immediate attention and cannot wait for a convenient time. In some examples, a timer expiration notification telling a user that the cookies need to be removed from the oven may require immediate attention.

Some alerts may require less immediate attention and can be delivered to a user device at a later time. For example, a reminder to remind the user to take out the trash can be delivered any time between 2 pm and 10 pm.

In some implementations, the alert property determination engine 130 can determine a specified time-range or a specific time to send the alert or the reminder. In some implementations, user devices can receive input from corresponding users which specifies a time-range to send a reminder of a scheduled event or activity, instead of requiring a specific time for the sending the reminder. For example, a notification that a slow-cooker is done can be handled anytime between 4 pm and 7 pm. Some reminders may require immediate attention from a user, and a user device can receive input from the user which specifies a specific time for sending the reminder. For example, a reminder to pick up a child from school may require an immediate response.

In some implementations, the alert property determination engine 130 can determine a maximum length of time that the alert can be delayed. In some implementations, user devices can receive input from corresponding users which configures a maximum length of time for which incoming notifications, e.g., notifications from external sources, can be delayed. In some cases, the maximum length of time for which incoming notifications can be delayed can be configured on a per-alert-type basis. For example, a user device can receive input from a corresponding user which sets up a configuration indicating that email notifications can be delayed for up to an hour, and text message notifications may be delayed for up to five minutes, and doorbell notifications may not be delayed at all. In some cases, an email service application can include both email alerts and calendar alerts, which can be configured differently. In some cases, notifications with the same alert-type (e.g., emails) can be configured differently. For example, a notification that a package has been shipped can be delayed almost indefinitely, but an email containing a meeting invitation may require sooner action (e.g., depending on the meeting time). The distinctions between notifications of the same alert-type can be learned over time based on historical observations, e.g., a combination of the sender, the content, and the user response-time.

In some implementations, the alert property determination engine 130 can assign a score to each incoming alert based on the properties of the alert, such as a likely level of urgency, a time range for sending the alert, a maximum length of time for which the alert can be delayed, a likely level of stress that the alert might bring to a user (e.g., estimated based on past observations).

The system 100 can include an alert notification timing determination engine 134. The alert notification timing determination engine 134 can determine an appropriate notification time of an alert based at least on the user status 128 determined from the user status monitoring engine 122 and one or more alert properties 132 determined by an alert property determination engine 130. After obtaining the current status 128 of a target user and obtaining a property, e.g., a time range, for an incoming alert, the alert notification timing determination engine 134 can decide whether to delay the alert or not. For example, if the user is currently in a videoconference call, and the system receives an incoming email alert 120 which can be delayed for up to an hour, the alert notification timing determination engine 134 can determine to temporarily delay the notification. The alert notification timing determination engine 134 can determine to deliver the notification to a target device either when the conference call is completed or after one hour, whichever comes first. In some cases, if a surplus of alerts, e.g., greater than a threshold value, arrive around the same time, the alert notification timing determination engine 134 can determine to delay some of the alerts to a later time.

When determining whether, when, or both, to provide an alert to a device for presentation to a user, the alert notification timing determination engine 134 can use one or more of the availability metrics. For instance, the alert notification timing determination engine 134 can use one or more of the time budget, the attention budget, or the stress budget to determine whether, when, or both, to provide an alert. The alert notification timing determination engine 134 can determine, for an alert, a predicted amount of time, a predicted amount of attention, a predicted amount of stress, or a combination of two or more of these, that the alert, the corresponding message, or both, will take. When the predicted metric satisfies, e.g., is less than or equal to, the corresponding budget for a particular time period, the alert notification timing determination engine 134 can determine to provide the alert during the particular time period. The particular time period can be a current time period or a future time period.

An example scenario of managing alerts based on user activities works as follows. In the example scenario, reference is made to various components of the system 100. However, different components in the system 100, or other components not described with reference to FIG. 1, can perform the various stages described in the example scenario.

In stage (A), the system 100 receives an incoming alert, e.g., an incoming email alert 120, which needs to be delivered to a target device of a target user 104 at a property 102. The system 100 can determine a target user 104, target user device, or both, that the incoming alert needs to be delivered to, e.g., based on the named recipient of the email alert. For example, the system 100 can receive an incoming email alert 120 that needs to be delivered to a target device of the target user 104, e.g., through an email application installed on the phone 116. The system 100 can send data corresponding to the incoming alert 120 to the alert property determination engine 130 that can determine one or more properties of the incoming alert. In some implementations, the system 100 can send data corresponding to the incoming alert 120 to a control unit 110 such that the control unit can collect information related to the alert or a target user, device, or both, of the alert.

In stage (B), one or more sensors 106 of the system 100 acquire sensor data of one or more areas of the property 102 that can be used to monitor a user's status. For example, a camera sensor 108 and an audio sensor 109 can be installed in a room inside the property 102 to collect sensor data 118. The sensor data 118 can include camera data that includes one or more images or videos showing that the target user 104 is currently in a videoconference call. The sensor data 118 can include audio data showing the user is currently in a conversation of the videoconference call. Concurrently, other sensors of the system may collect sensor data that can indicate the user's likely stress level. For example, a smart watch 114 that the target user 104 is wearing can measure and provide the changes of the user's heart rate that can be used to predict the user's likely stress level. The sensors 106 can provide the sensor data 118 to a control unit 110 through the network 105.

In stage (C), the control unit 110 sends the sensor data 118, other monitoring data, or both, to a user status monitoring engine 122. For example, the control unit 110 can send the camera data, the audio data, and the heart rate data in the sensor data 118 to the user status monitoring engine 122. The control unit 110 can send other monitoring data to the user status monitoring engine 122. Other monitoring data can include the user's likely historical stress level, information sent by one or more devices in the property 102 or from the user 104. For example, a phone 116 can provide an amount of notifications, e.g., emails, calls, text messages, reminders, that the phone 116 has received within a threshold period of time for the user. The phone 116 can send the amount of current notifications to the control unit 110 which can forward this information to the user status monitoring engine 122. In some implementations, one or more devices can directly send the other monitoring data to the user status monitoring engine 122, without going through the control unit 110. For example, the phone 116 can directly send the amount of current notifications to the user status monitoring engine 122.

In stage (D), the user status monitoring engine 122 receives sensor data 118 and monitors user status 128 of the target user 104 based on sensor data 118, other monitoring data, or both. The user status monitoring engine 122 can include a busyness monitoring engine 124, and the busyness monitoring engine 124 can determine, based on the camera data and audio data, that the user 104 is likely busy with a videoconference call. The user status monitoring engine 122 can include a stress level monitoring engine 126, and the stress level monitoring engine 126 can determine, based on heart rate data in the sensor data 118, and optionally, based on the camera data and the audio data, that the user is likely currently under a high level of stress. The user status monitoring engine 122 can send the user status 128 to the alert notification timing determination engine 134.

In stage (E), the alert property determination engine 130 receives the incoming alert and determines one or more properties of the incoming alert. The alert property determination engine 130 can obtain configuration data from a user device (e.g., the phone 116 or a computer 112) or the control unit 110. The configuration data can indicate one or more properties of the incoming alert, e.g., a time window of an alert, an urgency of the alert, or both. For example, the alert property determination engine 130 can receive an incoming email alert 120. The user 104 may have previously configured that email notifications can be delayed for up to an hour. Thus, the alert property determination engine 130 can determine the property 132 of the incoming email alert 120, including that the incoming email alert 120 may be delayed for up to one hour. The alert property determination engine 130 can send the alert property 132 to the alert notification timing determination engine 132.

In stage (F), the alert notification timing determination engine 134 receives user status 128 of the target user 104 from the user status monitoring engine 122, and receives the alert property 132 of the incoming alert from the alert property determination engine 130. Based at least on the user status 128 and the alert property 132, the alert notification timing determination engine 134 can determine whether to delay the alert or not. If the alert notification timing determination engine 134 determines to delay the alert, the alert notification timing determination engine 134 can determine an appropriate time to send the alert to a target device of the user at an appropriate later time. For example, because the user is likely currently busy with a videoconference call and the user is likely under a high level of stress, the alert notification timing determination engine 134 can determine to delay the alert and can determine to deliver the alert to the target device at an appropriate time 136, e.g., either when the videoconference call is completed or after one hour, whichever comes first.

In some implementations, one or more of the stages of (A) to (F) can be performed by a portable electronic device (e.g., a smart phone). For example, a portable electronic device can send a triggering signal to the camera 108 and instruct the camera to take an image of the user 104. In some implementations, one or more stages of (A) to (F) can be performed by a control unit 110 installed in the property 102.

Figure 2:
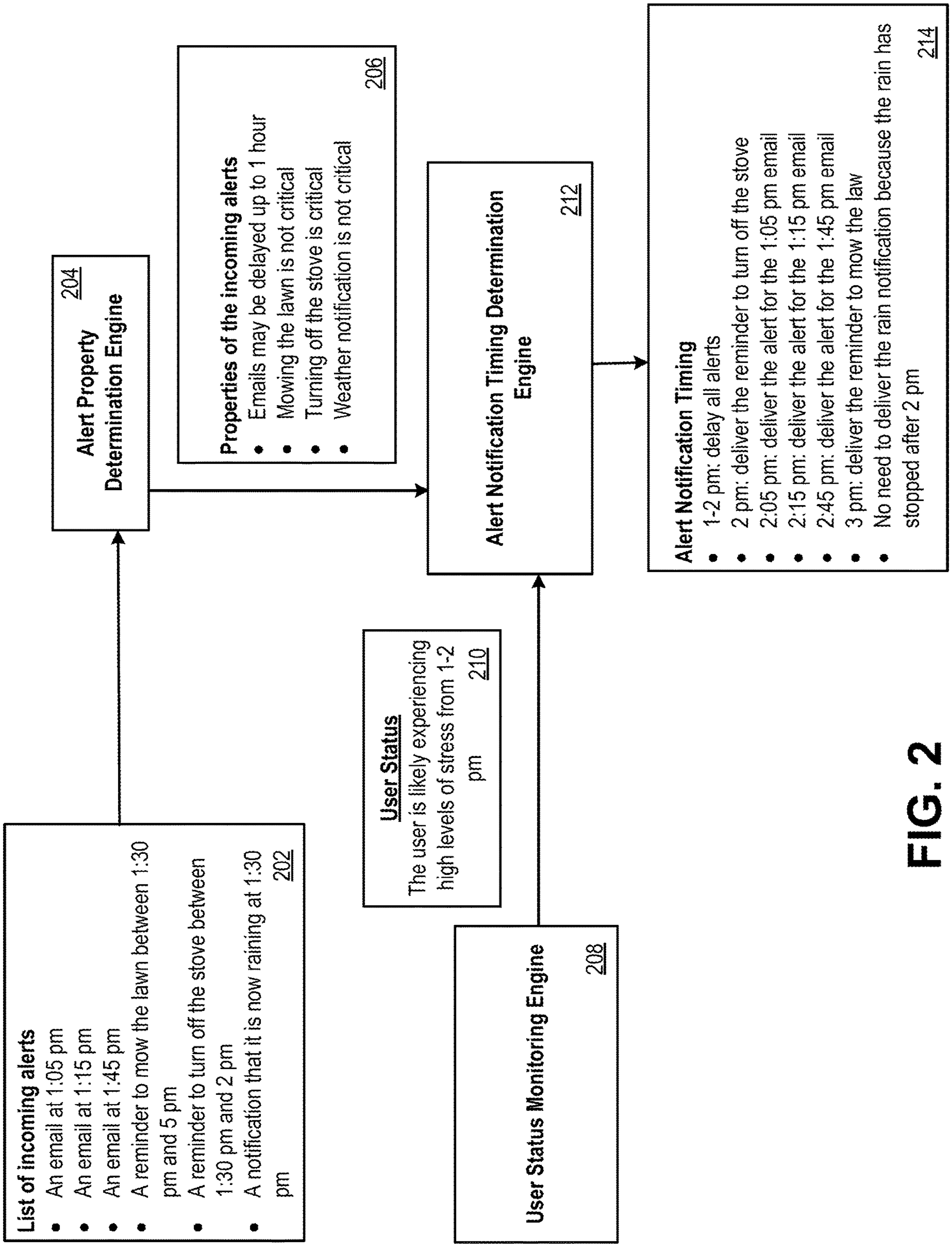
FIG. 2 is a diagram illustrating an example of delayed notifications.

FIG. 2 is a diagram illustrating an example of delayed notifications. In some situations, multiple notifications can be delayed and the system can determine an appropriate order and time to send the multiple delayed notifications, preventing sending a number notifications, e.g., greater than a threshold value, at the same time.

The user status monitoring engine 208 can monitor a status 210 of a target user. For example, the user status monitoring engine 208 can determine that the user is likely experiencing a high level of stress from 1 pm to 2 pm. The system can receive multiple incoming alerts 202 between 1 pm and 2 pm. For example, the system can receive one email at 1:05 pm, another email at 1:15 pm, and a third email at 1:45 pm. The user has set a reminder to mow the lawn sometime between 1:30 pm and 5 pm. The user has set another reminder to turn off the stove between 1:30 pm and 2 pm. The system receives a notification at 1:30 pm that it is raining.

The system can send the list of incoming alerts 202 to the alert property determination engine 204. The alert property determination engine 204 can determine one or more properties 206 for each incoming alert. For example, the user may have set up configuration for the system so that emails may be delayed for up to one hour, or any other appropriate time period, and the system can determine the maximum period of delay for the email notifications. The system can obtain a level of urgency for the alerts. For example, the system can determine that mowing the lawn is not critical and turning off the stove is critical. The system can determine the level of urgency based on activities of the user. For example, the system can determine that the weather notification is not critical because the user is currently working inside the house and the user's calendar does not show a planned event that requires the user to go outside the house.

In some implementations, the alert property determination engine 204 can determine the properties of an incoming alert based on another incoming alert. For example, based on the notification that it is now raining, the alert property determination engine 204 can determine that mowing the lawn is likely impossible because of the rain. Based on the determined context surrounding an alert, the alert notification timing determination engine 212 can determine to delay the lawn mowing notification until after the rain has stopped for some period of time, or can determine to switch the lawn mowing notification to a reminder to reschedule the lawn mowing.

Based on the user status 210 and the properties 206 of the incoming alerts, an alert notification timing determination engine 212 can determine an order with which to present alerts, whether the alerts are received at substantially the same time or received across a longer time period. For instance, the alert notification timing determination engine 213 can receive data for two or more alerts and determine to present some of the alerts while holding other alerts, or to hold all of the two or more alerts. In some examples, the alert notification timing determination engine 213 can determine to hold all of these delayable notifications during the likely high-stress period of 1-2 pm. The user status monitoring engine 208 can continue monitoring the status of the user. When the system determines that the user's likely stress level is back to normal at 2 pm, the system can present the notifications in an order based on the properties of the alerts at a controlled rate to reduce a likelihood that the user might be overwhelmed by receiving a large number of notifications, e.g., a number of notifications that exceed a threshold, at the same time or during a short period of time.

The system can start presenting notifications for the accumulated alerts one at a time, or in sets of two or more, based on the expiration time and the urgency of the alerts. Here, expiration time means the latest time at which a notification may be presented prior to the alert elapsing. For example, the system can present the email notifications in the order of the expiration time of the email alerts. While delivering the notifications, the system can continue to monitor for signs (e.g., user's likely stress level or other urgent alerts) and determine whether further delay may be called for. The user status monitoring engine 208 can monitor an amount of alert that the user is likely currently dealing with. If the user is likely already dealing with several incoming alerts, based on the urgency of the alerts, the system can determine whether some of the alerts can be further delayed until the user is likely less busy, likely under less stress, or both.

As shown in FIG. 2, an example alert notification timing 214 can be: at 2 pm, delivering the reminder to turn of the stove; at 2:05 pm, delivering the alert for the 1:05 pm email; at 2:15 pm, delivering the alert for the 1:15 pm email; at 2:45 pm, delivering the alert for the 1:45 pm email; at 3 pm, delivering the reminder to mow the lawn.

In some implementations, an alert may be expired or invalid when the system determines that a delayed alert can be sent to a user. An alert may unexpectedly become invalid if the alert is not addressed within some period of time. The system can determine to delete the alert and not send a notification of the alert to the user. For example, a weather application on a phone may provide a non-critical notification that it is now raining at 1:30 pm. This notification may be useful to the user while it is still raining. However, this notification can be delayed while the user is likely experiencing a high level of stress from 1-2 pm. After 2 pm, the system can determine that the notification is no longer useful to the user because the rain has stopped based on data provided by the weather application. Therefore, the alert notification timing determination engine 212 can determine that there is no need to deliver the rain notification and to skip delivery of the alert.

Figure 3:
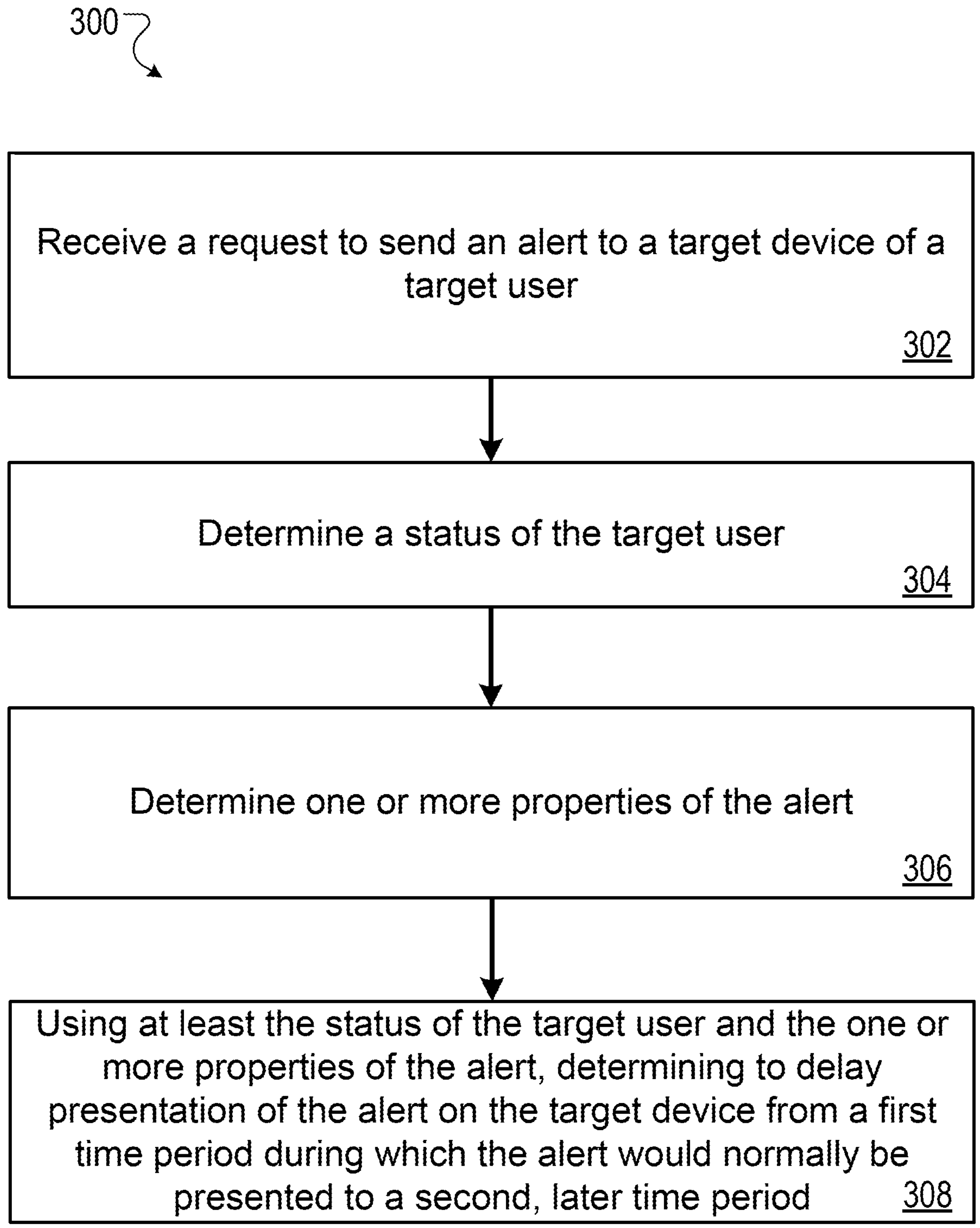
FIG. 3 is a flow chart illustrating an example of managing alerts based on user activity.

FIG. 3 is a flow chart illustrating an example of a process 300 for managing alerts based on predicted user activity. The process 300 can be performed by one or more computer systems, for example, the server 140, a portable electronic device (e.g., the laptop 112 or the phone 116), a control unit 110 installed in a property, or a combination of these. In some implementations, some or all of the process 300 can be performed by the system 100, or by another computer system located at the monitored property 102 or at a remote location.

The system receives a request to send an alert to a target device of a target user (302). For example, a server 140 may receive an incoming email alert 120, an incoming phone call, or an incoming text message. The alert can be generated from a smart appliance or a device in the property 102, such as a notification from a dryer indicating that the dryer cycle is completed, or a notification from a doorbell. The system can receive a request to send the alert to a device of the target user. For example, the system can send the alert through an application that is installed on a phone 116 or a laptop 112. The system can send the alert to a wearable device that the user is wearing, e.g., a smart watch 114.

The system determines the status of the target user (304). The system can determine the general likely busyness of the household and the level of activities for each individual user who may receive alerts. The system can determine the likely busyness level based on one or more sensors 106 of the property 102, other information of the target user, or both. The system can determine existing notifications that are presented on a display, e.g., for viewing by a target user. The presentation of the existing notifications on the display can cause the target user to currently deal or interact with the existing notifications. Based on the existing notifications that the target user is currently dealing or interacting with, the system can analyze a type of behavior of the user who is engaged in the activity. In some examples, the system can predict the likely stress level of the target user and can predict the target user's likely stress level based on historical monitoring data. In some examples, the system can predict a behavior type of the target user to be relaxed, e.g., a low stress level, based on a minimum number of notifications being received and a minimum level of activity being determined. In some examples, the system can predict a behavior type of the target user to be calm, e.g., a low stress level, based on a minimum number of notifications, a decrease in the user's heart rate, such as when the user's heart rate satisfies a low heart rate threshold, and facial recognition features detected by the sensors and provided in the sensor data indicating the user is not tense. Other examples are possible.

In some situations, a user may be engaged in an activity in which they do not appear particularly busy, but is still not something that should be interrupted. The system, e.g., the user status monitoring engine 122, can determine or predict these scenarios and can manage the incoming alerts based on the user status.

For example, data from a doorbell camera can indicate that a homeowner is either currently talking to someone at the door or is hosting a visitor who recently entered the house. Data from in-house cameras, smart speakers, or both can indicate that the alert's target user is in the middle of a conversation with another person. A user's phone 116 can recognize that the user is currently on a phone call. A user's phone 116 or tablet can recognize that the user is actively typing or otherwise actively interacting with an application. A user's phone 116 can recognize whether the user is actively responding to another notification at the current moment. For example, the phone can obtain information that indicates that the user just received a text message and the user is currently typing a response to that message, but has not sent the response yet. The system 100 can use the data from in-house sensors to determine a physical state of the target user, e.g., awake, standing, sitting, holding a pen, holding a baby, having a dog on a leash. Thus, the data can be used to determine whether the person can likely perform tasks that do not require using hands or moving to another location. In some cases, the system 100 can use the data from in-house sensors to determine whether a dog or other animal is likely already competing for attention from the user.

In some implementations, the system can determine a waiting period after the end of an event. The system can determine this waiting period to account for time after the event during which the user is likely still engaged in an activity related to the event. For example, after sending a text message, the system can determine a waiting period during which the user is likely responding to the text message. After a user arrives home and has just entered and shut the front door, the system can determine a waiting period, e.g., several minutes, during which the user might be taking a break before they are ready to deal with any notifications. After detecting water running in a bathroom and then shutting off, if the running of the water lasts a period of time that is less than a threshold value, the system can determine that user has likely washed their hands and the system can determine a waiting period, e.g., 30 seconds or more, such that their hands can dry off before the user can deal with any notifications. If the running of the water lasts a period of time that is larger than a threshold value, the system can determine that the user likely has showered, and the system can determine a longer waiting period, e.g., 3 minutes or more, such that the user can get dressed before the user can deal with any notifications. In some implementations, the system can learn the waiting period from historical observations. In some implementations, the system can assign predetermined waiting periods for events.

The system determines one or more properties of the alert (306). In some cases, a user device can receive input from a corresponding user which specifies a useful time-window of an alert, an expiration time of an alert, or both. In some cases, a user or the system can determine the level of urgency of an alert. In some cases, the system can determine whether an alert is expired or invalid based on information of the environment or sensor data collected by the sensors. For example, a user device can receive input from a corresponding user which sets a reminder for taking out trash anytime between 3 pm to 10 pm, and thus, the alert time-window is 3-10 pm. If the user has already taken out the trash at 12 pm, the system can determine the alert has expired or become invalid, and the system can cancel or delete the alert.

Using at least the status of the target user and the one or more properties of the alert, the system determines to delay presentation of the alert on the target device from a first time period during which the alert would normally be presented to a second, later time period (308). The system can determine the notification time of the alert based on the user's current status and the incoming alert's properties. For example, if the system determines that a reminder is scheduled for anytime between 3-5 pm and the system can determine that the user is likely unusually stressed at 3 pm, the system can delay the notification until either the user's likely stress-level decreases or until 5 pm, whichever comes first. In some examples, if the system receives five alerts all at once and the system determines that historical behavior data of the user indicates that the user is likely not going to respond to more than two notifications received at the same time, depending on the urgency of the alert, the system can delay the five notifications and can send them out over a longer period of time, e.g., over one hour.

In some implementations, the system can delay presentation of the alert on a client device to a later time period. The system can determine a time for presenting the alert on the client device of the user based on the user's current status, incoming alert's properties, other information, or a combination of these. The system can transmit the alert to the client device which causes delayed presentation of the alert to the determined time. For example, the system can receive an alert and determine that the user is likely available to view the alert at 4:00 PM. In response, the system can generate a message that includes the alert and instructions that causes the user's client device to delay presentation of the alert to a later time and transmit the message to the user's client device. In some cases, when the client device receives the alert, the client device may automatically notify the user of the alert, such as at 2:00 PM. However, the system can provide the message to the client device at approximately 2:00 PM that instructs and causes the user's client device to wait 2 hours to notify the user of the alert at 4:00 PM. In this manner, the system can determine a time that the user is likely available to view alerts and delay the presentation of these alerts on the user's client device to such time or time periods.

In some implementations, the system can delay sending the alert to the user's client device. In some examples, the system may delay sending the alert to the client device when the network, the client device, and/or the user is unavailable. When the network or client device become available or when the user is likely able to view the alert, the system can transmit the alert to the client device that causes the client device to present the alert to the user.

In some implementations, the system can assign one or more availability metrics to a user. The system can allocate the availability budget to the incoming notifications based on the one or more availability metrics of the user and based on the properties of the notifications, e.g., in an order of priority. For example, the system can allocate an availability budget for a time period based on the likely stress level of the user and the busyness of the user, etc. The availability budget can indicate that the user is likely only able to handle the most urgent one of the incoming alerts, and after that, the user will likely need a period of time, e.g., 5 minutes, before receiving another alert. Therefore, the system can send the most urgent alert to the user and wait a period of time. The system can reevaluate the one or more availability metrics of the user based on the queue of the incoming alerts and the user's status.

In some implementations, the system can perform fine-grained alert management based on fine-grained activity monitoring, detailed evaluations of the incoming alerts, or both. The system can adapt the alert notification based on detailed observations of user activity and detailed observation of the properties of the alerts.

In some implementations, the user status monitoring engine 122 can obtain more details about the user's activities, including the limitations of the user's activities. The user status monitoring engine 122 can determine whether the user is likely entirely off-limits, e.g., due to a likely stress level of the user, and determine whether to skip providing any alerts to the user device. The user status monitoring engine 122 can determine how interruptible the user's current activity is, e.g., the user can be interrupted when the user is baking a soufflé or talking to a door-to-door salesperson. This information can be obtained or inferred based on indoor cameras or the state of other (smart) items in the home, e.g., an oven, a refrigerator, house door, car door, etc. For example, an open refrigerator or an open house door may indicate the user is in the middle of something and a distraction could be undesired.

In some implementations, the alert property determination engine 130 can obtain more details about what is involved in responding to the incoming alert. For example, the system can determine whether the incoming notification can be delivered hands-free, e.g., with a voice assistant device. The system can determine what is required when the user responds to the alert. For example, whether the user needs to move to another location, whether the response requires talking (e.g., accepting a phone call requires talking), whether the response requires manual labor (e.g., whether the response requires the user's hands to be available), whether the response only requires basic acknowledgement (e.g., the user only needs to confirm that the received the alert, but does not need to do anything), whether the response requires the user to leave the house, or a combination thereof. The system can estimate the amount of time that it takes to respond to the alert. In some implementations, the system can infer these fine-grained details of the alerts based on the application triggering the alert. In some implementations, a user may manually specify these fine-grained details of the alerts, e.g., on an alert-by-alert basis.

Based on the details about the user's activities and/or the details about the incoming alerts, e.g., the details regarding what is involved in responding to the incoming alert, the system can perform fine-grained management of the alerts. For example, if the system obtains data indicating that the user is handling raw chicken, the system may be able to infer that the user's hands are off-limits, but other interaction is still acceptable. The user may be able to answer the phone (using a voice assistant and a speakerphone), but will not be able to fold clothing when the smart dryer has finished. Therefore, the system can send an immediate notification for an incoming phone call, but the system will probably delay the "dryer-is-done" notification until the user is in a better position to deal with it.

In some examples, the activity the user is engaged in may have scheduled or spontaneous periods where the user is likely less busy or more amenable to interruption. For example, the user can be in the middle of a conversation with another person when a delayable alert arrives. Rather than waiting until the user is completely done with the entire conversation, the system can wait for a natural lull in the conversation before delivering the notification. In some examples, the system may determine that the user is cooking a meal following a recipe that has a waiting period of 20 minutes during the cooking process, and the system may deliver the notification to the target device during the 20 minutes wait time.

For situations in which the systems discussed here collect personal information about users, or may make use of personal information, the users may be provided with an opportunity to control whether programs or features collect personal information (e.g., information about a user's social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user. Thus, the user may have control over how information is collected about him or her and used.

Figure 4:
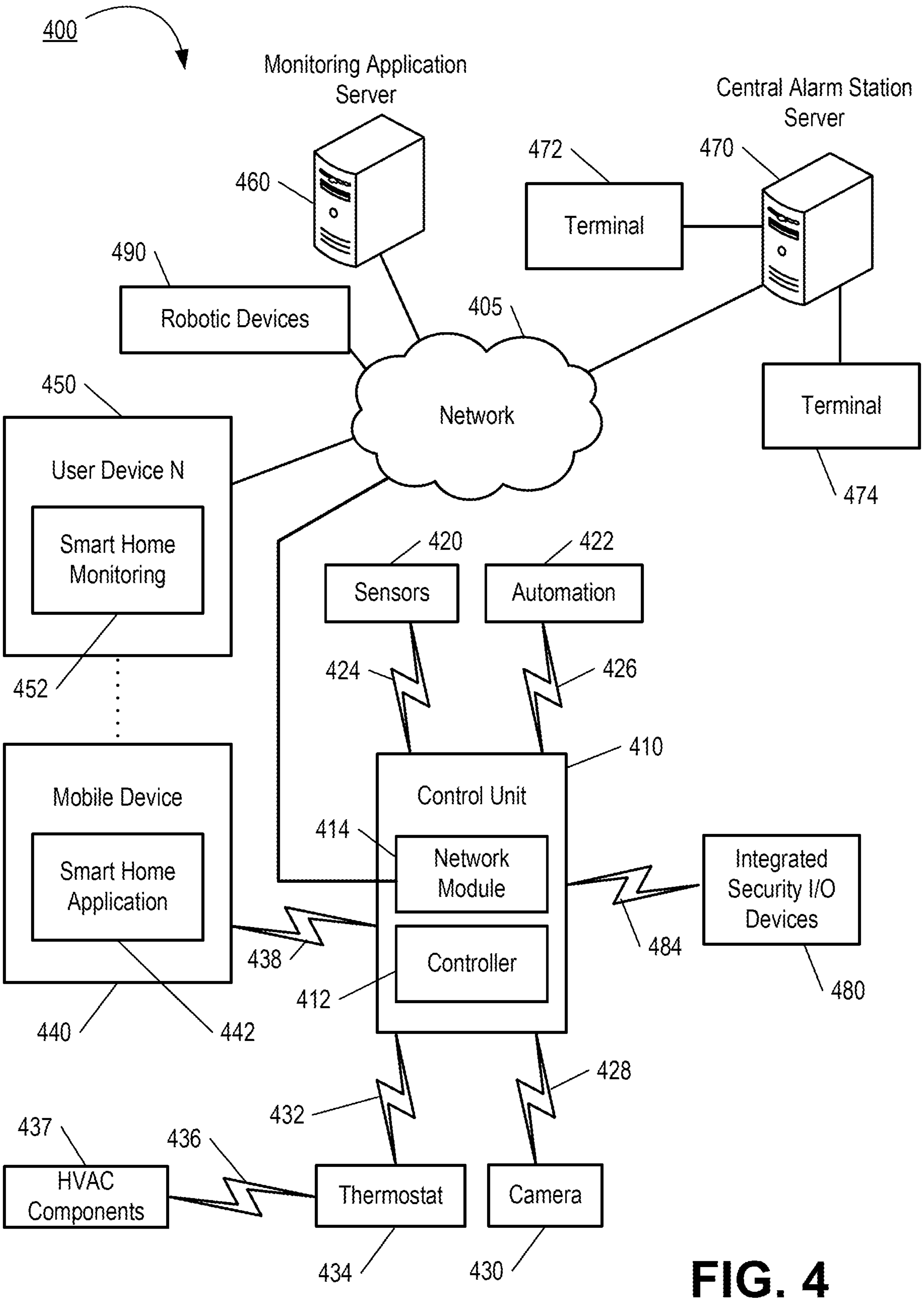
FIG. 4 is a diagram illustrating an example of a property monitoring system.

FIG. 4 is a diagram illustrating an example of a property monitoring system 400. The electronic system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, ZigBee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine a likely activity pattern of a resident of the home monitored by the system 400. In some implementations, the monitoring server 460 may analyze the data for temperature conditions or may determine and perform actions at the property by issuing commands to one or more of the adjustable textiles, possibly through the control unit 410.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 442. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, ZigBee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:

receiving a request to send a first alert to a target device of a target user;

obtaining, from one or more sensors at a monitored property, sensor data that monitors locations at the monitored property;

determining a predicted status of the target user, comprising:

determining, using the sensor data, a likelihood that the target user at the monitored property is likely engaged in an activity; and using the determined likelihood that the target user is engaged in the activity, determining the predicted status of the target user who is likely engaged in the activity;

determining one or more first properties of the first alert;

detecting one or more second properties of a second alert that is different than the first alert and for the target device;

using at least the predicted status of the target user and the one or more first properties of the first alert and the one or more second properties of the second alert, merging the first alert that includes at least first data with the second alert that includes at least second data for sending a single merged alert i) that includes the first data from the first alert and the second data from the second alert and ii) to the target device instead of the first alert and the second alert;

determining a time for sending the single merged alert to the target device using a result of whether the determined predicted status of the target user satisfies a threshold criteria and one or more properties of the single merged alert; and sending the single merged alert to the target device at the monitored property at the determined time.

2. The computer implemented method of claim 1, comprising:

using at least the predicted status of the target user and one or more properties of the single merged alert, determining to delay presentation of the single merged alert on the target device from a first time period during which the single merged alert would normally be presented to a second, later time period, comprising:

predicting a duration for an activity of the target user;

determining whether the predicted status of the target user satisfies a status criteria, wherein the predicted status is different than the activity of the target user; and in response to determining that the predicted status of the target user does not satisfy the status criteria, determining to delay presentation of the single merged alert on the target device to the second, later time period, wherein the second, later time period follows the predicted duration for the activity of the target user; and performing an action that causes presentation of the single merged alert on the target device of the target user at the second, later time period that follows the predicted duration for the activity of the target user.

3. The computer-implemented method of claim 2, wherein performing the action comprises:

in response to determining to delay presentation of the single merged alert on the target device, sending, to the target device, a message that includes instructions to cause the target device to delay presentation of the single merged alert from the first time period during which the alert would normally be presented to the second, later time period.

4. The computer-implemented method of claim 1, wherein determining, using the sensor data, the likelihood that the target user at the monitored property is likely engaged in the activity comprises determining, using the sensor data, a type of the activity the target user is likely engaged in.

5. The computer implemented method of claim 1, wherein determining the likelihood that target user at the monitored property is likely engaged in the activity uses at least one of:

a first level of movement of the target user in the monitored property;

a second level of movement of one or more other users in the monitored property;

a noise level associated with the target user or the one or more other users;

a number of notifications received by the target device of the target user within a threshold time period using one or more of (i) visualizations that display on the target device from the sensor data or (ii) auditory notifications that emit from the target device detected using the sensor data;

appliance data from one or more appliances at the monitored property;

a number of notifications received from the target device; or determining, from health monitoring data, a movement level of the target user.

6. The computer implemented method of claim 1, wherein determining the one or more first properties of the first alert comprises determining an expiration of time for sending the first alert to the target device prior to the alert elapsing.

7. The computer implemented method of claim 1, wherein:

determining the one or more first properties of the first alert comprises determining a type of interaction required when providing the received alert to the target user; and determining to delay sending the alert to the target device using the determined type of interaction.

8. The computer-implemented method of claim 2, wherein:

determining to delay presentation of the single merged alert on the target device comprises determining to delay sending the single merged alert to the target device for a delay time period to cause delayed presentation of the single merged alert on the target device during the second, later time period; and performing the action comprises sending, after waiting according to the second, later time period, a message that includes instructions to cause the target device to present the alert during the second, later time period.

9. The computer implemented method of claim 1, comprising:

determining, for an alert time period, a budget for alert notifications;

determining an availability budget for presentation of the single merged alert;

determining whether the availability budget satisfies the budget for alert notifications during the alert time period;

selecting a time period for sending the single merged alert to the target device using a result of the determination whether the availability budget satisfies the budget for alert notifications during the alert time period; and sending, to the target device, instructions to cause the target device to present the single merged alert during the time period.

10. One or more non-transitory computer storage media encoded with instructions that, when executed by one or more computers, cause the one or more computers to perform operations comprising:

receiving a request to send a first alert a) to a target device of a target user;

obtaining, from one or more sensors at a monitored property, sensor data that monitors locations at the monitored property;

determining a predicted status of the target user, comprising:

determining, using the sensor data, a likelihood that the target user at the monitored property is likely engaged in an activity; and using the determined likelihood that the target user is engaged in the activity, determining the predicted status of the target user who is likely engaged in the activity;

determining one or more first properties of the first alert;

determining one or more second properties of a second alert that is different than the first alert and for the target device;

using at least the predicted status of the target user and the one or more first properties of the first alert and the one or more second properties of the second alert, merging the first alert that includes at least the first data with the second alert that includes at least the second data for sending a single merged alert i) that includes the first data from the first alert and the second data from the second alert and ii) to the target device instead of the first alert and the second alert;

determining a time for sending the single merged alert to the target device using a result of whether the determined predicted status of the target user satisfies a threshold criteria and one or more properties of the single merged alert; and sending the single merged alert to the target device at the monitored property at the determined time.

11. The computer storage media of claim 10, the operations comprising:

determining to delay sending the first alert to the target device;

receiving a second request to send the second alert to the target device of the target user; and determining that the first alert and the second alert satisfy a similarity criteria, wherein merging the first alert that includes at least the first data with the second alert that includes at least the second data comprises:

in response to determining that the first alert and the second alert satisfy the similarity criteria, creating the single merged alert by merging the first alert that includes at least the first data and the second alert that includes at least the second data; and sending the single merged alert to the target device according to a determined delay.

12. The computer storage media of claim 11, wherein determining to delay sending the first alert to the target device comprises determining the delay.

13. The computer storage media of claim 10, wherein the single merged alert comprises data from a most recently generated version of the first alert or the second alert.

14. The computer storage media of claim 10, wherein merging the first alert with the second alert to create the single merged alert occurs during a first time period, the operations comprising:

determining to delay sending the single merged alert to the target device for a delay time period to cause delayed presentation of the single merged alert on the target device during a second, later time period; and transmitting, after waiting according to the second, later time period, a message that includes instructions to cause the target device to present the single merged alert during the second, later time period.

15. The computer storage media of claim 14, the operations comprising:

in response to determining to delay sending the single merged alert to the target device for a delay time period to cause delayed presentation of the single merged alert on the target device, transmitting, to the target device, a message that includes instructions to cause the target device to delay presentation of the single merged alert from a first time period during which the alert would normally be presented to the second, later time period.

16. The computer storage media of claim 10, wherein:

the first alert comprises a lawn mowing notification;

the second alert comprises a notification that it is raining; and the operations comprise determining to update the first data for the first alert by determining to switch the lawn mowing notification to a reminder to reschedule the lawn mowing.

17. A system comprising:

one or more computers and one or more storage devices storing instructions that are operable, when executed by the one or more computers, to cause the one or more computers to perform operations comprising:

receiving a request to send a first alert to a target device of a target user;

obtaining, from one or more sensors at a monitored property, sensor data that monitors locations at the monitored property;

determining a predicted status of the target user, comprising determining, using the sensor data, a likelihood that the target user at the monitored property is likely engaged in an activity; and using the determined likelihood that the target user is engaged in the activity, determining the predicted status of the target user who is likely engaged in the activity;

determining one or more first properties of the first alert;

determining one or more second properties of a second alert that is different than the first alert and for the target device;

using at least the predicted status of the target user and the one or more first properties of the first alert and the one or more second properties of the second alert, merging the first alert that includes at least first data with the second alert that includes at least second data for sending a single merged alert i) that includes the first data from the first alert and the second data from the second alert and ii) to the target device instead of the first alert and the second alert;

determining a time for sending the single merged alert to the target device using a result of whether the determined predicted status of the target user satisfies a threshold criteria and one or more properties of the single merged alert; and sending the single merged alert to the target device at the monitored property at the determined time.

18. The system of claim 17, the operations comprising:

determining to delay sending the first alert to the target device;

receiving a second request to send the second alert to the target device of the target user; and determining that the first alert and the second alert satisfy a similarity criteria, wherein merging the first alert that includes at least the first data with the second alert that includes at least the second data comprises:

in response to determining that the first alert and the second alert satisfy the similarity criteria, creating a single merged alert by merging the first alert that includes at least the first data and the second alert that includes at least the second data; and sending the single merged alert to the target device according to a determined delay.

19. The system of claim 18, wherein determining to delay sending the first alert to the target device comprises determining the delay.

20. The system of claim 17, wherein the single merged alert comprises data from a most recently generated version of the first alert or the second alert.

* * * * *